United States Patent [19]

Walsh

[11] 3,758,121

[45] Sept. 11, 1973

[54] TAPE CARTRIDGE EJECTOR SYSTEM FOR CASSETTE TAPE PLAYER

[75] Inventor: Raymond I. Walsh, Prospect Heights, Ill.

[73] Assignee: Motorola, Inc., Franklin Park, Ill.

[22] Filed: Aug. 5, 1971

[21] Appl. No.: 169,432

[52] U.S. Cl. .......... 274/4 E

[51] Int. Cl. .......... G11b 23/14, G11b 15/24

[58] Field of Search .......... 274/4 B, 4 C, 4 E, 274/4 F, 11 B, 11 C; 179/100.2 Z; 242/197–200, 55.19 A

[56] References Cited

UNITED STATES PATENTS

| | | | |
|---|---|---|---|
| 3,599,985 | 8/1971 | Huber | 274/4 B |
| 3,603,743 | 9/1971 | Ban | 179/100.2 Z |
| 3,604,862 | 9/1971 | Ban | 274/4 B |
| 3,638,953 | 2/1972 | Kodama | 274/4 E |
| 3,669,455 | 6/1972 | Cicatelli | 274/4 E |
| 3,669,456 | 6/1972 | Oteki | 274/4 C |

*Primary Examiner*—Louis R. Prince
*Assistant Examiner*—Dennis A. Dearing
*Attorney*—Vincent J. Rauner

[57] ABSTRACT

A tape cartridge ejector system for a cassette type tape player is equipped with means to automatically eject the cassette cartridge from the player upon de-energization of a low power solenoid. The de-energization of the solenoid can take place by any means as through the ignition switch, on-off switch, ejection switch, or power failure. The ejector apparatus utilizes stored mechanical energy from one or more springs and therefore even operates upon complete power failure to cause the cassette cartridge to be ejected automatically from the tape player.

5 Claims, 4 Drawing Figures

PATENTED SEP 11 1973

3,758,121

SHEET 1 OF 2

INVENTOR.
RAYMOND I. WALSH

BY Mueller & Aichele

ATTORNEYS.

INVENTOR.
RAYMOND I. WALSH

BY Mueller & Aichele

ATTORNEYS.

TAPE CARTRIDGE EJECTOR SYSTEM FOR CASSETTE TAPE PLAYER

BACKGROUND OF THE INVENTION

This invention relates generally to a tape cartridge ejector system, and more particularly to an ejector system for a cassette type tape player which allows automatic ejection of the cassette upon removal of energizing power to the tape player.

Cassette type tape players are currently being used for home entertainment centers and for installation in automobiles for playing prerecorded tapes. The cassette type tape players feature a compact structure which receives a cassette cartridge which contains two spools with a quantity of magnetic tape wrapped thereabout. The cassette cartridge is of well known configuration and is referred to most generally simply as a cassette. However, the broad aspects of this invention can be used on cartridge tape devices other than solely the cassette type.

The tape within the cassette cartridge is transported between the two spools during playback, record, fast forward, and fast reverse operations of the tape player. A magnetic pick up head is positioned to receive the signal information from the magnetic tape and deliver it to suitable electronic amplifier means for audio reproduction. Because of cost, the cassette type tape players generally are void of expensive features, such as automatic ejection of the cassette from the tape player at the end of tape travel or the like. To build a tape player unit with the automatic eject feature as an integral part of the tape player, there are cost disadvantages which are encountered. For example, such units may be manufactured in a relatively small number as compared to units not requiring the automatic eject feature, thus increasing the relative production cost of the unit because of their low production quantities. Also, the relative complexity of the tape player may be increased.

Although the basic concept of automatic eject is not new in the art, as pointed out in U.S. Pat. No. 3,439,184, which is assigned to the same assignee as the present application, they require the actuation of some electronic or electromechanical device to effect the ejection operation. The automatic eject systems of the prior art would release the cartridge, from the playback and record postion to an ejected position, which may be an intermediate position, upon de-actuation of one of several switches connected to an operating circuit. By opening any one of the switches, the circuit is then activated to energize an eject solenoid which, in turn, causes the actual ejection of the cartridge. However, should a complete power failure occur, the cartridge ejection circuitry would then be completely disabled and the ejection solenoid can not be energized to effect automatic ejection of the cartridge.

SUMMARY OF THE INVENTION

Accordingly, it is an object of this invention to provide an improved and inexpensive tape cartridge ejector system which will operate upon actuation, i.e., open circuit, of anyone of a plurality of switching circuits as well as operate when a complete power failure occurs.

Still another object of this invention is to provide an improved tape cartridge ejector system which can be formed into an adapter unit and retrofitted to existing cassette type tape players to convert the tape player to a multi-function eject unit.

Briefly, the tape cartridge ejector system of this invention includes a housing in which are supported a tape transport and paper playback mechanism for proper transport and operation of the tape within the cartridge. When a cassette cartridge is inserted into the tape player it is usually first positioned to an intermediate position. Then a manually operated actuating lever or button is manipulated to move the cartridge from the intermediate position to a playback and record position where the tape spools within the cartridge are mounted on take-up spindles and a capstan drive mechanism and tape head are brought into engagement with the tape for playback and record operations. A pair of levers are pivotally mounted to the housing of the tape player and each lever has connected thereto a spring which stores mechanical energy for ejection of the tape cartridge. At least one of the levers is held in the eject-ready position by a low power solenoid. When power is removed from the tape player and the solenoid is deenergized this lever is moved from the eject-ready position to activate the eject mechanism of the tape player and return the cartridge to the intermediate position. The second lever, also initially moved by the actuating lever, is moved to an eject-ready position and held there by latch means until either power is removed from the tape player or a subsequent actuation of the actuating means takes place. Therefore, when power is applied to the low powered solenoid, the eject mechanism can be manually operated completely independent of the automatic eject feature without deenergizing the holding coil of the solenoid.

The tape cartridge eject system of this invention can be formed as an adapter unit to be retrofitted to existing cassette type tape players. In this instance the ejector system is formed on a U-shaped support frame which is mounted in close fitting inverse cradle fashion to the existing housing of a tape player structure and fastened thereto by screws or rivets. The U-shaped support frame will then be part of the housing with the levers and springs secured thereto, and which are actuated in response to operation of the tape player. The levers are connected to springs which store mechanical energy therein for the eject operation and, complete and automatic eject of the cartridge is effected without regard to how power is removed, i.e., either by one of a plurality of sequence switches or by complete power failure.

DESCRIPTION OF THE ILLUSTRATED EMBODIMENT

The tape cartridge ejector system of this invention can be utilized in any type of cartridge tape player and it will be understood that the illustrated embodiment is only for purposes of facilitating an understanding of the adaptability of such a system. Therefore, the adapter unit illustrated herein is only one novel arrangement in which the ejector system can be utilized.

Figure 1:
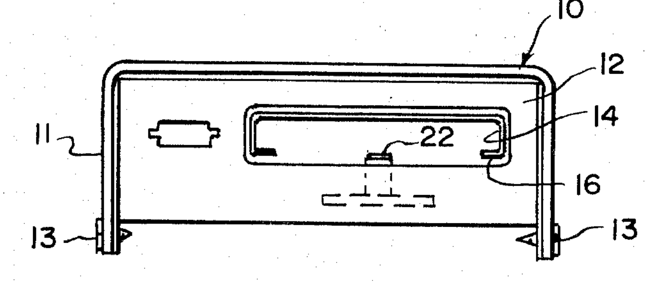
FIG. 1 is a front view of a cassette type tape player incorporating the tape cartridge ejector system of this invention.

Referring now to FIG. 1, the cartridge ejector system of this invention is designated generally by reference numeral 10. The ejector system 10 is shown in one of its preferred embodiments as an adapter unit which is formed on a frame 11 which fits overs a pre-existing cassette type tape player 12 in inverse cradle fashion and fastened thereto by a plurality of screws 13. The tape player 12 and adapter unit may be housed in a larger outer casing, not shown, which provides a smooth outer container having a decorative escutcheon. The frame 11, which may be considered part of the housing of the tape player, supports the actuating components for the automatic eject operation of the tape cartridge. The components on the U-shaped support frame 11 are arranged to coact with existing actuating components of the tape player so that no alterations of an existing tape player are necessary.

Figure 2:
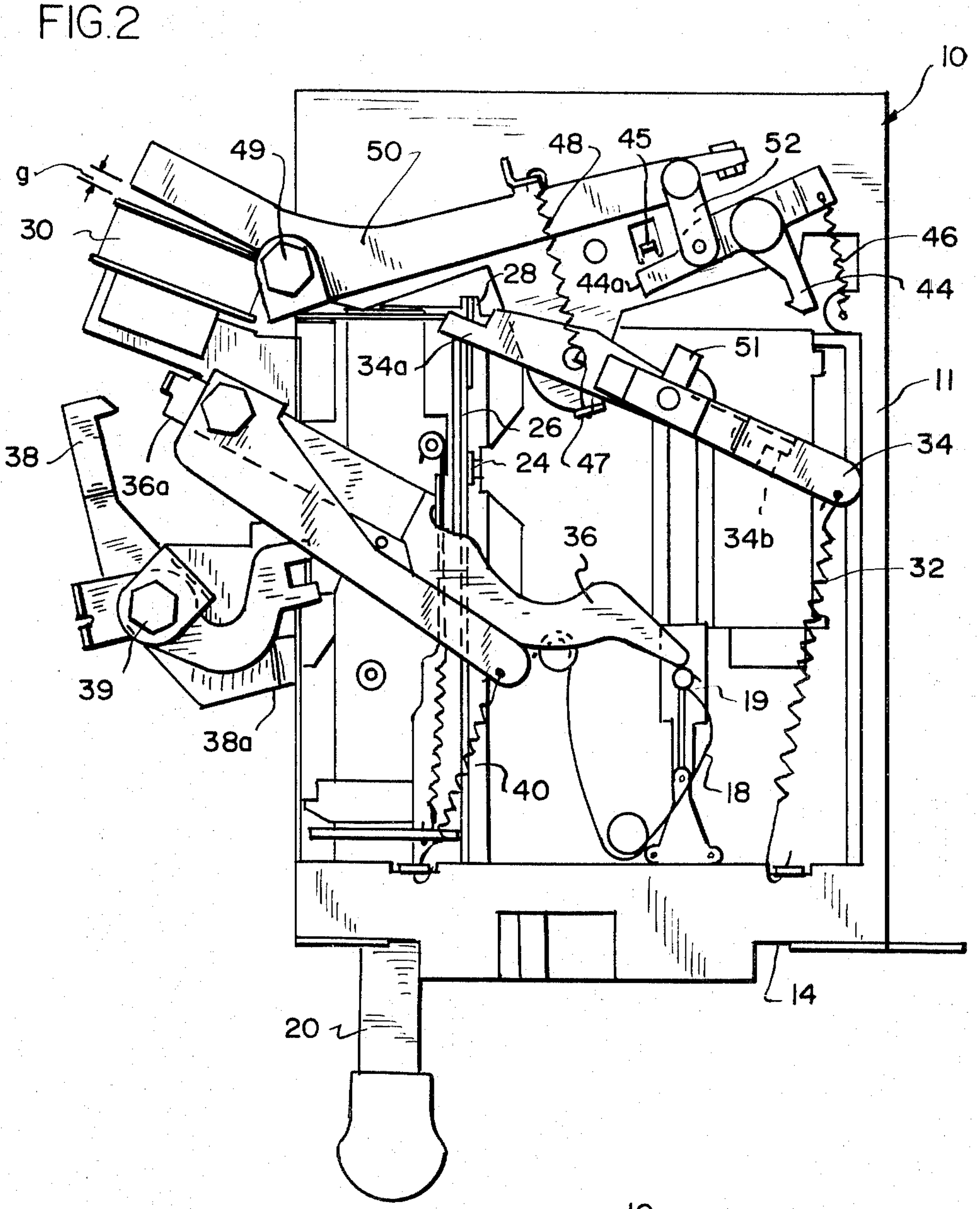
FIG. 2 is a top view of the tape player of FIG. 1 showing the levers and springs in the normal position with no cassette cartridge inserted into the player.
Figure 3:
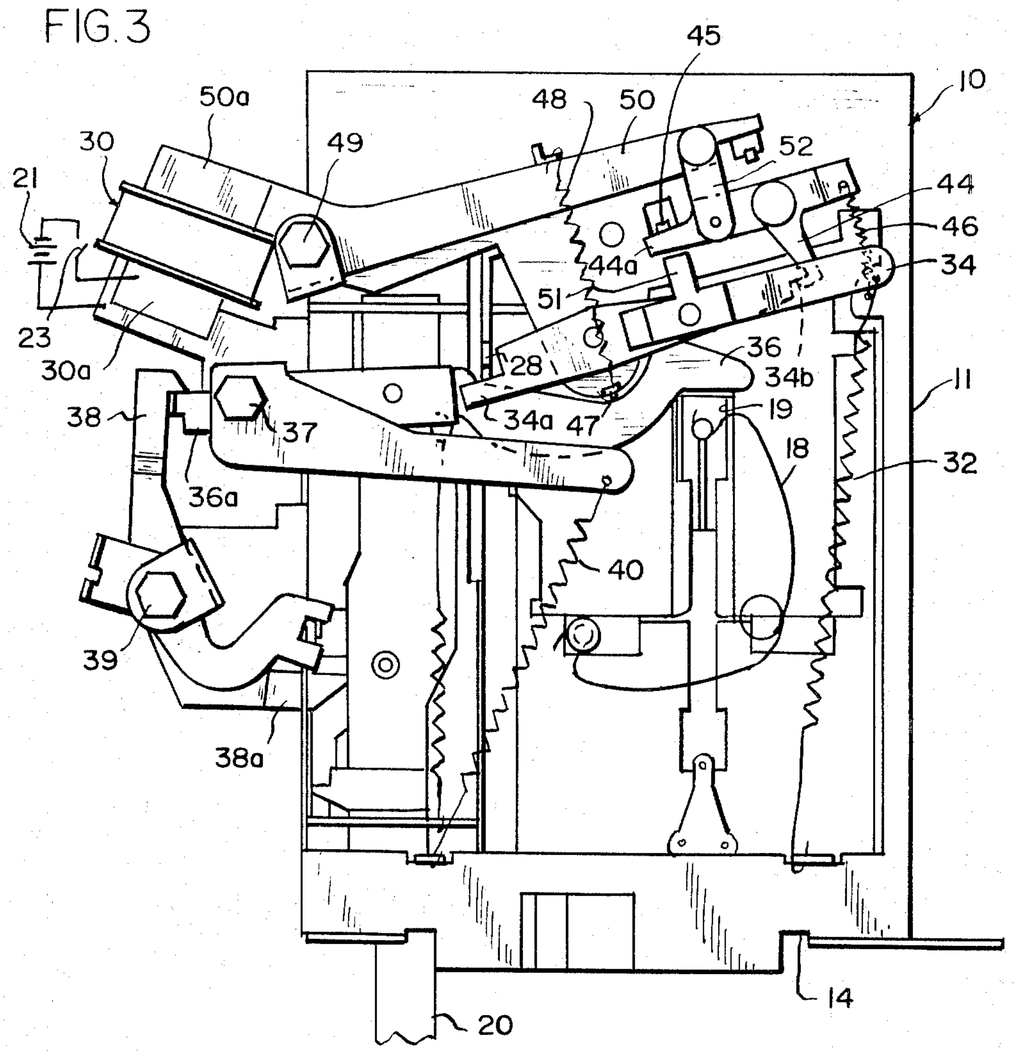
FIG. 3 is a top view of the tape player of FIG. 1 with the levers and springs shown in an eject-ready position when a cassette cartridge is inserted into the tape player and is in the play position.

A cartridge receiving portion of entryway 14 is formed within the housing of the tape player 12 and a movable carriage 16 is located within the entryway 14 to receive a cassette cartridge. When a cassette cartridge is inserted into the entryway 14 to be positioned into the carriage 16, an overcenter spring 18 and slide member 19 are engaged by the cassette cartridge to draw the cassette cartridge into the tape player to an intermediate position, this being best illustrated by FIGS. 2 and 3. That is, FIG. 2 shows the overcenter spring 18 and slide member 19 in a neutral position before a cassette is inserted into the entryway 14. FIG. 3, however shows the overcenter spring 18 and slide member 19 in the retracted position after a cassette cartridge has been inserted into the entryway 14. Subsequent inward manipulation of an actuating lever 20 will cause the cassette cartridge, which travels with the carriage 16, to be lowered from the intermediate position downward to a playback and record position so that a pair of spindles within the tape player engage the tape reels within the cartridge to transport the tape in the usual and well known manner. Also, within the tape player are playback means to receive the audio signal information from the tape and amplify the signals to produce audible sound.

Upon inward movement of operation of the actuating lever 20 the levers and springs of the ejector system are operated or moved to an eject-ready position. For example, a first lever 34 and its associated spring 32 are secured to the housing in such a manner that the lever 34 is coupled to the actuating means 20 for setting the position of the lever 34 to an eject-ready position when the cartridge is moved from the intermediate position to the playback and record position. The spring 32 stores mechanical energy while the cassette cartridge is moved from the intermediate position to the playback and record position and this mechanical energy is held in the spring continuously by the energization of a low power solenoid 30 which holds the lever 34 in the eject-ready position. That is, the solenoid 30 has an armature 50 extending therefrom which is mechanically coupled to the first lever 34 in such a manner as to hold the lever 34 in a rearward cocked position, i.e., an eject-ready position as best seen in FIG. 3.

The holding coil 30*a* of the solenoid 30 is energized by a voltage source 21 through a suitable switching arrangement which is indicated generally by reference numeral 23. The switching arrangement 23 may be a plurality of series connected switches, any one of which, when opened, will de-energize the solenoid 30. For example, an ignition switch, eject switch, or other mode switch may be represented by the single switch 23. Therefore, the lever 34 will remain in the rearward cocked position and spring 32 will be under tension. The cartridge, when in the playback and record position, can also be ejected by a subsequent manual actuation of the actuator means 20, which will operate the mechanical eject system. However, deenergization of the holding coil 30, by opening of switch 23, will cause lever 34 to be released so that the notched end 34*a* thereof strikes against an upwardly extending tab 28 of the actuating mechanism to automatically raise the cartridge from the playback and record position to the intermediate position whereupon it is then ejected forward through the entryway 14. This causes the cassette cartridge to be ejected a sufficient distance so it can be grasped by the user and easily removed from the tape player.

In the illustrated embodiment the armature 50 of the solenoid 30 is connected to a releasable pawl member 44 by a link 52. The pawl member 44 is pivotally secured to the top wall of the housing to be in one position for holding the first lever 34 in the eject-ready position as shown in FIG. 3, this being accomplished during electrical energization of the holding coil 30*a*. Upon de-energization of the holding coil 30*a*, a bias spring 48, which is connected between the armature 50 and a spring receiving tab 47 on the housing, will pull the armature toward the front of the tape player, which in turn, pivots the pawl member 44 to a second position where it releases the lever 34 under the tension of spring 32 to cause automatic actuation of the eject mechanism. During this initial stage of the eject operation the cassette cartridge will raise from the playback and record position to the intermediate position, this being illustrated by the upward position of the carriage 14 as seen in FIG. 1.

The solenoid 30 is of low power design and may not have sufficient initial energization forces to pull the armature 50 so that the latching end 50*a* is in the energized closed position, as shown in FIG. 3. That is, the solenoid may not have sufficient power to close the gap *g* as shown in FIG. 2. However, by manual manipulation of the actuator 20 to the rearward position, to effect moving a cassette cartridge from the intermediate to the playback position, a tab 51 on the lever 34 will engage an extended end 44*a* of the pawl 44 to push it rearwardly against a stop 45 formed in the housing. This rearward movement of the end 44*a* of the pawl 44 causes the armature 50 to pivot about its support bolt 49 and close the gap *g*. Once the gap is closed, and energizing power applied to the holding coil 30*a*, the low power solenoid 30, has sufficient wattage rating to maintain the armature in the energized position. During subsequent manual operation of the actuator 20, once the holding coil 30*a* is initially electrically energized, the holding coil 30*a* is continued to be energized, and the tape player will function entirely by manual eject means.

To eject the cartridge from the intermediate position forward to extend from the entryway sufficient to be grapsed by the operator, a second eject lever 36 is pivotally secured to the housing by a mounting or support bolt 37 and held in an eject-ready position by a latch 38. The lever 36 is also manipulated or actuated to an eject-ready position by the actuating lever 20 against the force of a second spring 40 which also stores mechanical energy. The outer most end of the lever 36 engages the slide member 19 which, in turn, as mentioned previously, works against the cassette cartridge but this time to run it forward as spring 40 pulls the lever forward. The latch 38 is pivoted by support bolt 39 and has one end thereof 38*a* extending into the housing and operated by a traveling pin, not seen, which releases the latch 38 upon either manual or automatic eject operation. That is, the latch 38 is operated during each eject operation of the cassette cartridge while the solenoid 30 is de-energized only upon removal of energizing power.

Figure 4:
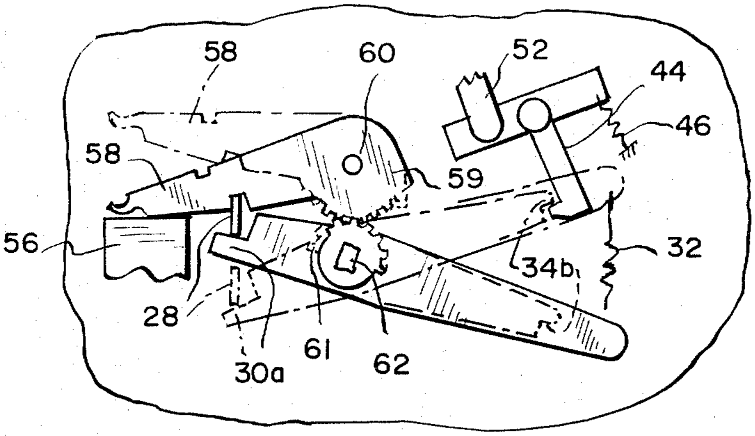
FIG. 4 is a fragmentary portion of a geared lever located under a cradle support frame of an adapter unit which incorporates the ejection system of this invention.

For a better understanding of the actuation of the first pivotal lever member 34, reference is now made to FIG. 4 which shows the lever 34 and segments of the apparatus which actuate the same. For example, a fragmentary portion 56 which is associated with the rear portion of the actuator means 20, is shown engaging an arm 58. The arm 58 has a gear segment 59 formed at one end thereof and pivoted about its axis 60. The arm 58 is underneath the top wall of the U-shaped support frame 11 or housing near the rear portion thereof. The gear segment 59 engages a mating gear segment 61 associated with the lever 34 which is staked thereto by a square shaft 62 or the like. The gear segments 59 and 61 are also mounted underneath the support frame 11 and the lever 34 is located at the top of the support frame. The upwardly extending finger 28 connected to the actuating mechanism of the tape player is shown in both its retracted position in solid lines and in its actuated positions in broken lines thus corresponding to the two positions of the arm 58 and the pivotal lever 34. When the end 34*a* urges the finger 28 rearward, the carriage 16 will be raised to the position corresponding to intermediate position. Once in this intermediate position, mechanical but automatic release of the lever 36 (FIG. 3) is accomplished by actuation of the latch 38 which drives the cassette cartridge unit forward and partially out of the entryway 14 where it will remain until completely removed by the user.

What has been described is a simple and efficient cassette cartridge ejector system which can be formed as an adaptor unit to be mounted on a cassette type player to convert the tape player for a multi-function automatic cartridge eject. The cartridge is ejected upon deenergization of a low power holding solenoid thus providing the eject feature even in the event of complete power failure.

I claim:

1. In a cartridge tape player including a housing having a cartridge receiving portion into which a cartridge is readily inserted to an intermediate position and manually operable actuation means movable from a first to a second position for moving the cartridge from said intermediate position to a playback and record position, the improvement therein comprising, an automatic cartridge eject mechanism including in combination, a first pivotal lever means secured to said housing and having a portion thereof engageable with said actuation means for setting said first pivotal lever means to an eject-ready position when said actuation means is operated to move the cartridge from the intermediate position to a playback and record position, a first spring connected to said first pivotal lever means for storing mechanical energy when the cartridge is moved from the intermediate position to the playback and record position, a solenoid having an armature and a holding coil, said armature being mounted for movement toward and away from said holding coil, said holding coil arranged to receive energizing power to maintain said first pivotal lever means in said eject-ready position in response to the movement of said armature toward said holding coil, mechanical latch means mounted for pivotal movement on said player and being mechanically coupled to said armature and positioned for engagement with said pivotal lever means upon moving the latter to said eject-ready position to retain said pivotal lever means in said position while said cartridge is in said playback and record position, and means for deenergization of said holding coil to release said armature for movement away from said holding coil, said latch means in response thereto releasing said first pivotal lever means from said eject-ready position to then operate said actuation means from said second to said first position for moving the cartridge from the playback and record position to the intermediate position.

2. A cartridge tape player as claimed in claim 1 wherein said mechanical latch means includes pawl member which is pivotally secured to said housing to be in one position for holding said first pivotal lever means in said eject-ready position, and bias spring means connected between said armature and said housing to release said pawl member to another position upon deenergization of said holding coil to cause movement of the cartridge from the playback and record position to the intermediate position.

3. A cartridge tape player as claimed in claim 2 wherein said mechanical latch means further includes a tab member formed on said first pivotal lever means and extending toward said pawl member to engage the same when said actuatiom means is manually operated to thereby shift the position of the armature of said solenoid into close proximity with said holding coil, which, when energized, will continue to hold said armature and pawl member in said one position.

4. A cartridge tape player as claimed in claim 1 further including cartridge eject means for moving said cartridge out of said cartridge receiving portion of said housing, said eject means being engageable with said cartridge upon insertion thereof into said cartridge receiving portion and operable from an eject to an eject-ready condition in accordance therewith, wherein said automatic eject mechanism further includes a second pivotal lever means secured to said housing and having a portion thereof selectively engageable with said actuation means for setting said second pivotal lever means to an eject-ready position for engagement with said cartridge eject means, a second spring connected to said second pivotal lever means for storing mechanical energy when the cartridge is moved from the intermediate position to the playback and record position, and means for securing said second pivotal lever means in said eject-ready position, said securing means being coupled to said actuation means and released thereby upon de-energization of said holding coil to permit said second pivotal lever means to be returned by said second spring to move said cartridge eject means from said eject-ready to the eject condition for driving said cartridge from said cartridge receiving portion.

5. A cartridge tape player as claimed in claim 1 wherein said first pivotal lever means, said first spring, and said solenoid are mounted on an adapter unit to be retro-fitted to a tape player having said manually operable actuation means to convert it to automatic ejection of the cartridge whenever power is removed from the tape player.

* * * * *